Figure 1:
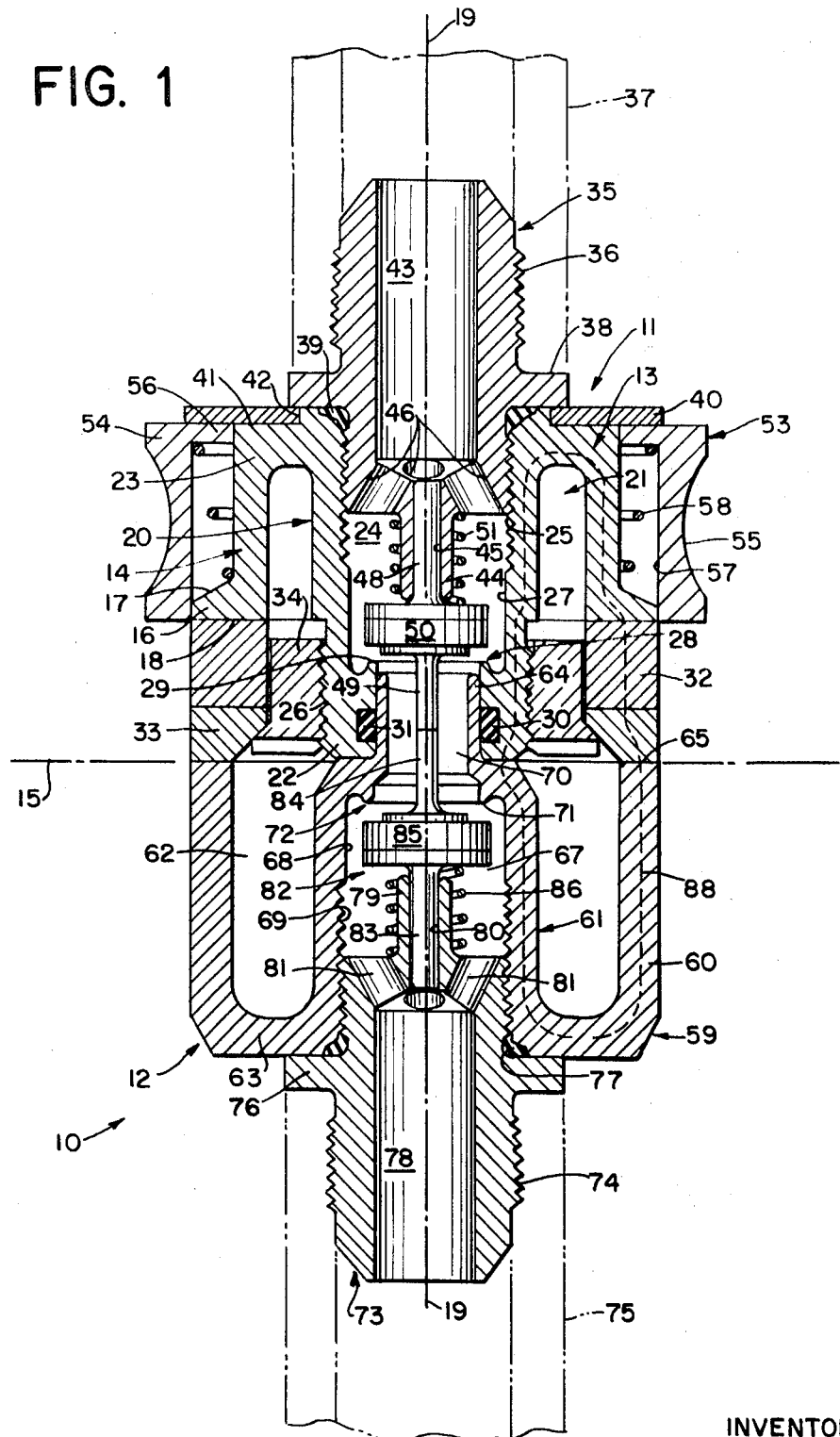

United States Patent

[11] 3,586,048

| [72] | Inventor | Kurt Herbert Arnold<br>West Caldwell, N.J. |
|---|---|---|
| [21] | Appl. No. | 789,876 |
| [22] | Filed | Jan. 8, 1969 |
| [45] | Patented | June 22, 1971 |
| [73] | Assignee | Valcor Engineering Corporation<br>Kenilworth, N.J. |

[54] MAGNETIC COUPLING
11 Claims, 2 Drawing Figs.

[52] U.S. Cl. ............................................... 137/614.04,
  285/9
[51] Int. Cl. ............................................... F16l 29/00
[50] Field of Search ........................................... 137/614.04,
  15; 285/9 M; 192/84 PM

[56] References Cited
UNITED STATES PATENTS
2,962,143  11/1960  Heinemann .................. 192/84

3,053,365  9/1962  Allen ............................ 192/84
3,234,965  2/1966  Anderson ..................... 137/614.04

FOREIGN PATENTS
983,278  2/1965  Great Britain ................ 285/9

*Primary Examiner*—Alan Cohan
*Attorney*—Darby and Darby

ABSTRACT: The present invention includes a valved magnetic coupling of a quick-disconnect type. The coupling includes first and second body members adapted to matingly engage with one another, a permanent magnet for inducing a primary magnetic flux path through the first and second body members when in a coupled position, thereby magnetically holding the body members in locked engagement with each other, and manually operable shunt means for diverting the primary magnetic flux path, thereby diminishing the magnitude of the magnetic force holding the body members in locked engagement.

INVENTOR
KURT HERBERT ARNOLD

BY Darby & Darby
ATTORNEYS

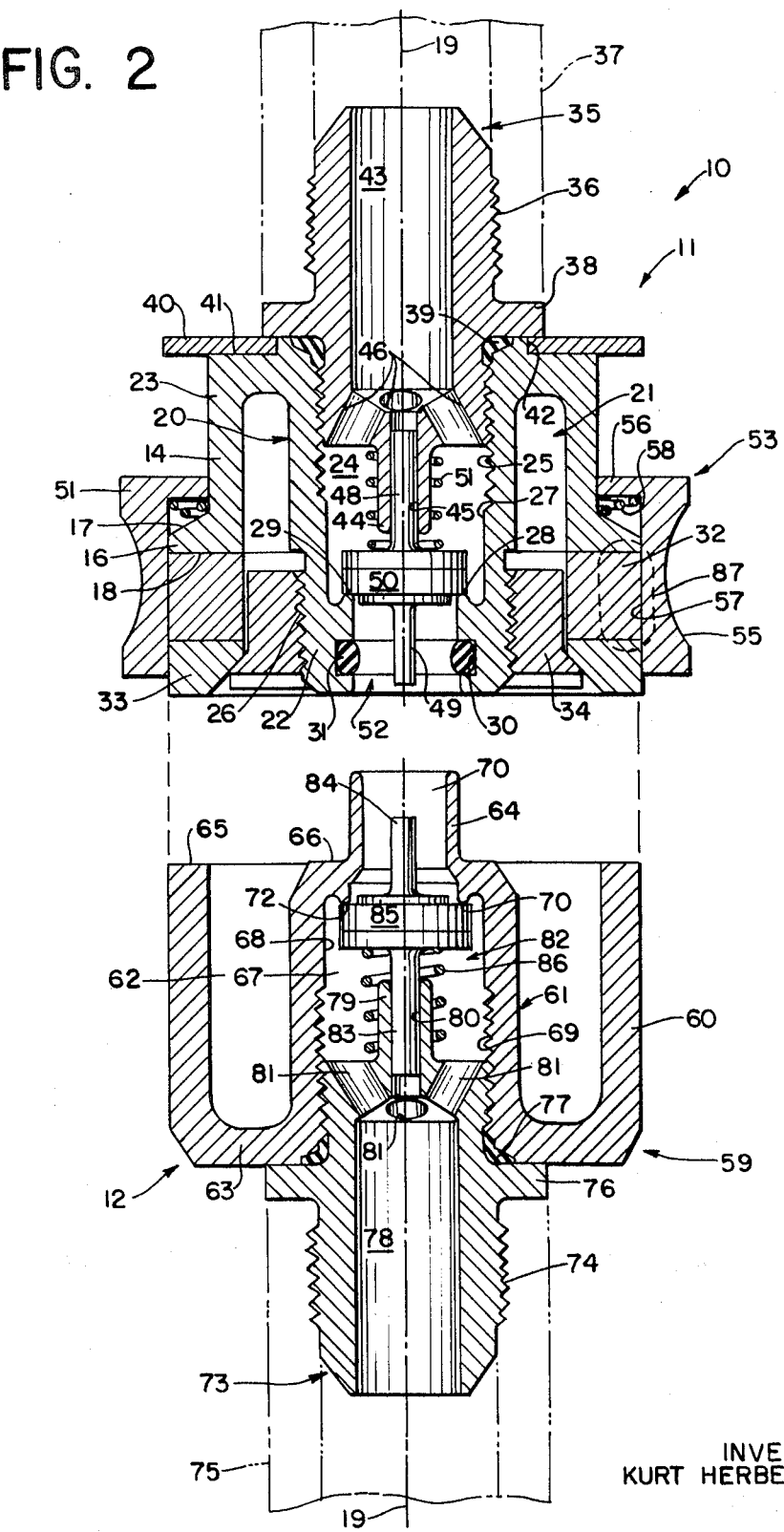

MAGNETIC COUPLING

This invention relates generally to couplings and connectors and more particularly to a valved magnetic quick-disconnect fluid coupling.

Increasing reliance upon pneumatic controls and fluid couplings has created a need for inexpensive quick-connect and quick-disconnect couplings. In addition, many industries utilize fluid conduits which include couplings requiring periodic disassembly to permit thorough cleaning and inspection. To date, the designs of fluid couplings which may be reliably disconnected and reconnected have included expensive and rather intricate locking detents actuated by springs and sleeves. Various other coupling structures are known to the art which employ solely mechanical interaction of coupling elements, these structures requiring considerable effort on the part of the user to manipulate, and in many cases special coupling tools are necessary to unlatch the components.

Aside from the fact that coupling structures known to the art are relatively expensive and often cumbersome to manipulate, a need exists for a relatively inexpensive coupling which may be rapidly and manually disconnected and/or connected, and which provides a reliable joint for use with conduits supplying life-sustaining constituents to environmental chambers, for example.

Accordingly, it is an object of the present invention to provide a valved magnetic quick-disconnect fluid coupling which utilizes a shunt ring for diverting a magnetic flux path induced by a permanent magnet.

Another object of this invention is to provide a coupling having two principal body members which, when brought into mating engagement with one another, cause valves located within each of the body members to be opened, thereby permitting fluid flow between the body members.

A further object is to provide a relatively inexpensive valved coupling structure which utilizes magnetic forces to both urge the coupling elements together and to magnetically lock these elements in mating engagement with one another.

Yet another object of this invention is to provide a coupling structure including elements which may be accurately aligned and which are releasably held together by magnetic means.

The present invention fulfills the aforementioned objects and overcomes limitations and disadvantages of prior art solutions to problems affecting fluid coupling structures. According to one aspect of the present invention, separate male and female body members each carry a fitting to which a fluid conduit may be connected. The body members are each formed with an opening extending longitudinally therethrough, and each houses a spring biassed valve assembly which is normally in a closed position, thereby preventing fluid flow through the respective body member. A permanent magnet encircles a portion of the female body member and is held between the female body and a spacer ring by a threaded nut. In a coupled position wherein the male and female body members are in mating engagement with one another, the permanent magnet induces a closed circuit magnetic flux or magnetic flow which has a path extending through portions of both the male and female body members. A shunt ring, which is spring-biased toward an inactive position, is manually movable between active and inactive positions. When moved to its active position, the shunt ring diverts the path of the magnetic flux induced by the permanent magnet such that the magnetic flux path no longer extends through the male body member. As a result of this shunting or diverting of the path of the magnetic flux, the magnetic forces created by the permanent magnet tending to urge the male and female body members into a locked relationship with each other are markedly diminished, thereby permitting relative ease in separation or disconnection of the male body member from the female body member.

The invention will be more clearly understood from the following description of a specific embodiment of the invention together with the accompanying drawings, wherein similar reference characters denote similar elements throughout the views, and in which, FIG. 1 is a sectional elevational view of a magnetic coupling according to the present invention, depicted in a coupled position;

FIG. 2 is a sectional elevational view of the coupling of FIG. 1 in an uncoupled position.

Referring now to FIGS. 1 and 2, a coupling 10 is shown including two halves, 11 and 12 respectively. FIG. 1 shows halves 11 and 12 in a coupled position, while FIG. 2 shows halves 11 and 12 uncoupled and separated from one another.

Coupling half 11 includes a body member 13 having an outer generally cylindrical annular portion 14 which extends forwardly (toward an interface plane designated 15) to an outwardly extending flange 16. Flange 16 is formed with a conical bearing surface 17 as well as an annular surface 18. Cylindrical portion 14 extends coaxially with respect to an axis 19, which represents the longitudinal axis of coupling 10 as well as the axis of alignment of the various elements of the coupling.

Body member 13 further includes an inner hollow portion 20 spaced from portion 14 by an annular gap 21 and extending coaxially with respect to axis 19 toward a forward end portion 22. Forward end portion 22 extends beyond annular surface 18 of portion 14 toward interface plane 15. Portions 20 and 14 are integrally connected by a transversely extending wall 23. Inner portion 20 defines an opening 24 extending longitudinally therethrough, and is further formed with internal threads 25 in a wall 27. Wall 27 bounds a part of opening 24. External threads 26 are formed in the outside surface of forward end portion 22. A valve seat 28 is formed by an annular ridge 29 which extends within opening 24 and which forms a part of forward end portion 22. An internal groove 30, within which an elastomeric sealing O-ring 31 is situated, is formed in this end portion.

Coupling half 11 further includes a cylindrical permanent magnet 32 extending coaxially around inner portion 20 and held in abutting relationship with annular surface 18 of outer annular portion 14 by a spacer ring 33. Both permanent magnet 32 and spacer ring 33 are held in the position shown in FIGS. 1 and 2 by a nut 34 threaded upon external threads 26 of forward end portion 22.

A fitting 35 engages threads 25 of the inner portion 20 of body member 13. Fitting 35 is formed with external threads 36 at its rearward end for accommodating a fluid conduit shown in phantom outline and designated 37. Fitting 35 is formed midway along its length with a radially extending flange 38 which compresses an elastomeric seal ring 39 between fitting 35 and body member 13 such that a fluidtight seal is created therebetween. Flange 38 further engages a washer 40 which, in turn, encircles a turned-down diameter portion 42 of body member 13 and further contacts face 41, as defined by wall 23.

Fitting 35 is formed with a hole 43 extending coaxially through the fitting with respect to axis 19, and includes a cylindrical extension 44 at its forward end which defines a bore 45 communicating with and forming part of opening 43. A plurality of apertures 46 formed in fitting 35 and spaced around extension 44 communicate with both hole 43 and opening 24.

A valve member assembly 47 is movably disposed within opening 24 of body member 13 and includes a rearward shaft 48 as part of a valve stem which is reciprocally movable within bore 45 of cylindrical extension 44. The valve stem of valve member assembly 47 further includes a forward shaft 49 which extends coaxially with respect to rearward shaft 48 and axis 19 toward coupling half 12. These shafts are integral with a central grooved portion on which a rubber valve member 50 is mounted. A helical spring 51 encircles cylindrical extension 44 and biases valve member 50 into engagement with valve seat 28, thereby preventing fluid flow between opening 24 and an entrance chamber 52 defined by forward end portion 22 and which communicates with opening 24. Fluid from conduit 37 is free to flow from the conduit through hole 43 and apertures 46 into opening 24 where further flow is regulated by the relative position of valve member 50 with respect to valve seat 28.

A shunt ring 53 encircles coupling half 11 and includes a cylindrical portion 54 formed with a groove 55 which is adapted to accept the fingers of a user of coupling 10. Shunt ring 53 further includes an inwardly turned flange 56 which engages the exterior wall of outer annular portion 14. Cylindrical portion 54 has an inside cylindrical wall 57 which engages the outside diameter portions of flange 16, permanent magnet 32, and seal ring 33 when shunt ring is moved into the active position, shown in FIG. 2. A helical compression spring 58 normally biases shunt ring 53 into the inactive position shown in FIG. 1 where flange 56 abuts washer 40 and in which wall 57 only contacts flange 16 of outer annular portion 14. Spring 58, in urging shunt ring 53 to the inactive position, bears against bearing surface 17 as well as the inside of flange 56.

Looking now at half 12 of coupling 10, a body member 59 includes a cylindrical outer annular portion 60 which extends coaxially with respect to axis 19 toward interface plane 15, as shown in FIG. 1. Body member 59 includes a cylindrical inner portion 61 which is spaced along its length from outer annular portion 60 by an annular gap 62. Inner portion 61 is joined at its rearward end to outer annular portion 60 by means of a transversely extending wall 63.

Inner portion 61 includes a protruding forward cylindrical member 64 having a diameter which permits its mating entry into entrance chamber 52 of forward end portion 22 such that elastomeric O-ring 31 engages outer cylindrical surfaces of cylindrical member 64 in a fluidtight sealing relationship, as shown in FIG. 1. An annular bearing surface 65 of outer annular portion 60 and a bearing surface 66 defined by inner portion 61 both lie within interface plane 15 and engage seal ring 33 and forward end portion 22, respectively, when coupling halves 11 and 12 are coupled as shown in FIG. 1.

Inner portion 61 is formed with an opening 67 defined by inner wall 68 and internal threads 69. Opening 67 communicates with an opening 70 within protruding forward cylindrical member 64, these openings defining a path for fluid flow as will be described later. An annular ridge 71, which forms part of inner portion 61, defines a valve seat 72.

A fitting 73, which may be virtually identical in all respects with fitting 35, thereby permitting interchangeability of parts and thus lower material costs, is threaded into thread 69 of body member 59. Fitting 73 includes external threads 74 on its rearward portion which will accommodate a fluid conduit 75 shown in phantom outline. Fitting 73 includes a radially extending flange 76 which compresses an elastomeric seal ring 77 against body member 59, thereby forming a fluidtight seal between fitting 73 and body member 59. Fitting 73 is formed with a longitudinally extending hole 78 which extends therethrough.

Fitting 73 includes a cylindrical extension 79 formed with a bore 80 which communicates with hole 78. Apertures 81 formed in fitting 73 communicate both with hole 78 and with opening 67.

A valve member assembly 82, which may be virtually identical in all respects with valve member assembly 47, is movably disposed within body member 59. Valve member assembly 82 includes a valve stem having a rearward shaft 83 movably disposed within bore 80 of cylindrical extension 79. A forward shaft 84 joins rearward shaft 83 at a central grooved section on which a rubber valve member 85 is mounted. A helical spring 86 encircles cylindrical extension 79 and biases valve member 85 toward and into engagement with valve seat 72.

A primary feature of the present invention resides in the magnetic coupling of coupling halves 11 and 12 as a result of the magnetic properties of permanent magnet 32. In the preferred embodiment of this invention shown in FIGS. 1 and 2, the various elements already described are formed or made from materials which will provide magnetic flux or flow characteristics yielding the greatest magnetic locking features. Body members 13 and 15 as well as spacer ring 33 are made from materials having a relatively high magnetic permeance, thereby permitting magnetic flow therethrough with little effective magnetic reluctance. Various types of stainless steel which have noncorrosive properties are preferred. Nut 34, on the other hand, should have a relatively high reluctance or resistance to magnetic flow such that the closed circuit magnetic flows designated numerals 88 and 87 for FIGS. 1 and 2, respectively, result, as will be explained below. Nut 34, as well as the fittings, are preferably made from aluminum or aluminum alloys, although other materials may be substituted and still come within the present invention. The shunt ring 53 itself may be formed from cold rolled steel or an equivalent.

In operation, assuming for a starting point that coupling halves 11 and 12 are uncoupled or spaced apart as shown in FIG. 2, the halves are first generally aligned coaxially as shown. As coupling halves 11 and 12 are brought together manually or otherwise, protruding forward cylindrical member 64 enters entrance chamber 52, which may be beveled if desired. Further movement of halves 11 and 12 toward one another will result in the ends of forward shafts 49 and 84 abutting and axially forcing valve members 50 and 85 away from their respective valve seats 28 and 72 against the biasing forces of springs 51 and 86, respectively. The displacement of the valve members from their respective valve seats may be controlled by varying the lengths of the respective forward shafts with respect to the assembled distance between valve seats 28 and 72. Thus, the longer the forward shafts are made, the greater the distance the valve members will be displaced from their respective valve seats.

Still further movement of the coupling halves 11 and 12 toward one another will result in body members 59 and 13 abutting at interface place 15, as shown in FIG. 1. At this point in the assembly of coupling 10, shunt ring 53 is initially moved manually away from coupling half 12 and is permitted to further move from its active position to its inactive position shown in FIG. 1 as a result of biasing or urging of spring 58.

Examining now the effect of this latter movement of shunt ring 53 from its active to its inactive position, it can be seen from FIG. 2 that the active position of shunt ring 53 results in a closed circuit magnetic flux path induced by permanent magnet 32 and designated 87, extending from permanent magnet 32 through flange 16 into shunt ring 53, and thereafter from shunt ring 53 through spacer ring 33 into the opposite side of permanent magnet 32. This closed circuit magnetic flux path will result in the case when permanent magnet 32 includes its end adjacent flange 16 being of a polarity which is different from its end adjacent and in contract with spacer ring 33. It should be noted that in this active position, movement of coupling half 12 into engagement with coupling half 11 will not appreciably affect this closed circuit flux configuration. It is also to be noted that shunt ring 53 is held in its active position by means of permanent magnet 32 until the user of coupling 10 desires to move shunt ring 53 to its inactive position whereby coupling halves 11 and 12 will be magnetically locked into engagement as shown in FIG. 1.

Looking now at FIG. 1, after having moved shunt ring 53 toward washer 40 so as to disrupt the path already described and illustrated as 87, a closed circuit magnetic flux path configuration designated 88 will be induced by permanent magnet 32. As shown, configuration 88 includes magnetic flow from permanent magnet 32 through outer annular portion 14, thereafter through transverse wall 23 and into inner portion 20, thereafter through interface plane 15 into inner portion 61, thereafter through wall 63 into outer annular portion 60 and finally across interface plane 15 through spacer ring 33 and into the opposite side of permanent magnet 32. With configuration 88, coupling halves 11 and 12 are magnetically locked together in a fluidtight aligned joint which permits fluid flow between conduits 37 and 75. Assuming fluid pressure in conduit 75 being greater than that in conduit 37, fluid will flow into hole 78 of fitting 73 thereafter through apertures 81 into opening 67, thereafter past valve seat 72 into opening 70, thereafter past valve seat 28 into opening 24 and finally through apertures 46 and hole 43 into conduit 37.

Should it be desired to disconnect coupling halves 11 and 12 rapidly and without effort, shunt ring 53 is simply moved from its inactive position as shown in FIG. 1 to its active position as shown in FIG. 2, thereby diverting the magnetic flux path from a configuration shown as 88 to that shown as 87, and breaking the closed circuit magnetic flow between body portions 13 and 59. Halves 11 and 12 may then be easily separated. The mating of protruding forward cylindrical member 64 with forward end portion 22 assures axial alignment of the coupling halves.

The preferred embodiment described for FIGS. 1 and 2 does away with umbilical cord disconnect arrangements and locked ball arrangements which are susceptible to corrosion. In addition, the magnetic properties of permanent magnet 32 afford excellent axial strength characteristics.

The embodiment of the invention particularly disclosed is presented merely as an example of the invention. Other embodiments, forms and modifications of the invention coming within the proper scope of the appended claims will of course readily suggest themselves to those skilled in the art.

What I claim is:

1. Coupling apparatus comprising a first body member, a second body member adapted to cooperatively engage said first body member, means for inducing a primary magnetic flux path through said first and second body members, thereby holding said body members in engagement with each other with a force, and shunt means for diverting said primary magnetic flux path, thereby diminishing the magnitude of said force wherein said first body member comprises a first outer annular portion extending substantially coaxially with respect to a first axis and defining a first bearing surface; a first inner portion spaced from said first outer annular portion and extending substantially coaxially with respect to said first axis between a first forward end and a first rearward end, said first inner portion defining a first opening extending therethrough and further including a first valve seat communicating with said first opening, first rearward internal threads communicating with the first opening, first forward external threads, and an internal groove disposed forward of said first valve seat; a first juncture portion integral with both the first rearward end of said first inner portion and said first outer portion and extending transversely with respect to said first axis; and a seal ring disposed within said groove, said means for inducing a primary magnetic flux path including a permanent magnetic contact with said first body member, and said shunt means including a movable ring encircling a portion of said first body member.

2. Coupling apparatus according to claim 1, wherein said second body member comprises a second outer annular portion extending substantially coaxially with respect to a second axis, and defining a second bearing surface; a second inner portion spaced from said second outer annular portion and extending substantially coaxially with respect to said second axis between a second forward end and a second rearward end, said second inner portion defining a second opening extending therethrough and further including a second valve seat communicating with said second opening, second rearward internal threads communicating with the second opening, and a hollow protruding forward member integral with said second forward end adapted to matingly enter said first forward end and engage said seal ring, said first and second axes substantially coinciding with one another.

3. Coupling apparatus according to claim 2, further comprising a first fitting threadedly engaging said first rearward internal threads and being formed with a first hole extending longitudinally therethrough, said first fitting including and a first main portion defining a plurality of first apertures communicating with both said first hole and the exterior of said first cylindrical extension, a first cylindrical extension formed with a first bore which forms a portion of said first hole, said first cylindrical extension being integral with and extending from said first main portion into said first opening, said first hole communicating with said first opening.

4. Coupling apparatus according to claim 3, further comprising a second fitting threadedly engaging said second rearward internal threads and being formed with a second hole extending longitudinally therethrough, said second fitting including a second main portion defining a plurality of second apertures communicating with both said second hole and the exterior of said second cylindrical extension, and a second cylindrical extension formed with a second bore which forms a portion of said second hole, said second cylindrical extension being integral and extending from said second main portion into said second opening, said second hole communicating with said second opening.

5. Coupling apparatus according to claim 4, further comprising first and second valve member assemblies, said first valve member assembly being movable within said first opening and comprising a first valve stem having a first forward shaft and a first rearward shaft each integral with a first central grooved portion, said first rearward shaft extending into said first bore of said first extension; said first forward shaft extending within said first opening toward said second body member, a first valve member mounted on said first central grooved portion and adapted to sealably engage said first valve seat, and a first spring urging said first valve member toward said first valve seat; said second valve member assembly being movable within said second opening and comprising a second valve stem having a second forward shaft and a second rearward shaft each integral with a second central grooved portion, said second rearward shaft extending into said second bore of said second extension, said second forward shaft extending within said second opening toward said first body member, a second valve member mounted on said second central grooved portion and adapted to sealably engage said second valve seat, and a second spring urging said second valve member toward said second valve seat.

6. Coupling apparatus according to claim 5, further comprising a spacer ring in contact with said permanent magnet, and a threaded member threadedly engaging said first forward external threads for retaining said permanent magnet between and in contact with said spacer ring and said first outer annular portion of said first body member.

7. Coupling apparatus, according to claim 6, wherein said shunt means includes a movable ring formed with an inwardly turned flange portion having a flange bearing surface, and a cylindrical inner wall extending substantially coaxially with respect to said first axis, said coupling apparatus further comprising a shunt spring engaging said flange bearing surface at one end thereof and said bearing surface of said first outer annular portion, thereby urging said shunt ring away from said permanent magnet to an inactive position.

8. Coupling apparatus according to claim 7, wherein said shunt ring is movable manually from said inactive position against the force of said shunt spring to an active position wherein a primary magnetic flux path induced by said permanent magnet extends from one side of said permanent magnet through said spacer ring into said shunt ring, thereafter through a portion of said first outer annular portion and into an opposite side of the permanent magnet, said first and second fittings being adapted to engage fluid carrying conduits.

9. Coupling apparatus according to claim 8, wherein said first and second body members matingly engage one another in a coupled position, said coupled position including said first and second forward shafts coaxially engaging one another, thereby causing an unseating of said valve members from said respective valve seats against the urging forces of said valve member assembly springs to permit fluid flow between said first and second holes.

10. Coupling apparatus according to claim 9, wherein said first and second body members are disengaged from one another in an uncoupled position, said uncoupled position including said valve members being seated upon their respective valve seats, thereby preventing fluid flow between said first and second holes.

11. Coupling apparatus according to claim 9, wherein said fluid flow assumes a path defined by said first hole, said first apertures, said first opening, said second opening, said second apertures and said second hole.